US012709474B2

United States Patent
(12) Chen et al.

(10) Patent No.: US 12,709,474 B2
(45) Date of Patent: Aug. 18, 2026

(54) SHUTTLE VEHICLE

(71) Applicant: Beijing Jingdong Qianshi Technology Co., Ltd., Beijing (CN)

(72) Inventors: Xiaochong Chen, Beijing (CN); Qiang Zhang, Beijing (CN); Zongjing Yu, Beijing (CN); Guoku Song, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 583 days.

(21) Appl. No.: 18/022,359

(22) PCT Filed: Oct. 22, 2021

(86) PCT No.: PCT/CN2021/125718
§ 371 (c)(1),
(2) Date: Feb. 21, 2023

(87) PCT Pub. No.: WO2022/095732
PCT Pub. Date: May 12, 2022

(65) Prior Publication Data
US 2023/0312246 A1 Oct. 5, 2023

(30) Foreign Application Priority Data
Nov. 9, 2020 (CN) ........................ 202011237192.X

(51) Int. Cl.
*B65G 1/04* (2006.01)

(52) U.S. Cl.
CPC ......... *B65G 1/0492* (2013.01); *B65G 1/0435* (2013.01)

(58) Field of Classification Search
USPC ........................................ 414/277, 279, 280
See application file for complete search history.

(56) References Cited

U.S. PATENT DOCUMENTS 4,358,239 A * 11/1982 Dechantsreiter ..... B65G 1/0435 414/661
4,556,355 A 12/1985 Glater
(Continued)

FOREIGN PATENT DOCUMENTS

AU 2018282330 A1 1/2019
CH 684403 A5 9/1994
(Continued)

OTHER PUBLICATIONS

International Search Report and Written Opinion for International Application No. PCT/CN2021/125718, dated Jan. 26, 2022, 7 pages.

(Continued)

*Primary Examiner* — Mark C Hageman
(74) *Attorney, Agent, or Firm* — Buchanan Ingersoll & Rooney PC

(57) ABSTRACT

A shuttle vehicle, comprising a vehicle body (100), a travelling apparatus (200) and a box conveying and pickup apparatus (300); two horizontal support plates (110) provided in parallel and spaced apart are fixed on the vehicle body, the two horizontal support plates are located on the same horizontal plane and form a gap therebetween; the box conveying and pickup device comprises a chain assembly (310) and a fork (20), the chain assembly comprises a chain (311), a sprocket group (312) and a chain driving device (350); a first end (321) of the fork is fixedly connected to the chain, and a second end of the fork extends outwards in the normal direction of the chain; and a bent portion (322) bending upwards is formed at the second end, and is used for contacting with the inner wall of a groove (31) at the bottom of a material box (30).

14 Claims, 9 Drawing Sheets

(56) References Cited

U.S. PATENT DOCUMENTS

| | | | | |
|---|---|---|---|---|
| 4,690,602 | A * | 9/1987 | Castaldi | B65G 1/0435 414/280 |
| 5,199,840 | A * | 4/1993 | Castaldi | B65G 1/0435 414/280 |
| 5,213,463 | A * | 5/1993 | Rothlisberger | B65G 1/0435 414/280 |
| 5,551,823 | A * | 9/1996 | Maruyama | B65G 1/0435 414/280 |
| 6,619,902 | B1 * | 9/2003 | Castaldi | B65G 1/0435 414/280 |
| 6,997,665 | B2 * | 2/2006 | Bouche | B65G 1/0435 414/280 |
| 10,283,394 | B2 | 5/2019 | Abe et al. | |
| 11,338,996 | B2 * | 5/2022 | Zhu | B65G 1/0492 |
| 2022/0212868 | A1 * | 7/2022 | Liu | B65G 1/0464 |

FOREIGN PATENT DOCUMENTS

| | | | |
|---|---|---|---|
| CN | 103895999 | A | 7/2014 |
| CN | 205471039 | U | 8/2016 |
| CN | 206172327 | U | 5/2017 |
| CN | 210214684 | U | 3/2020 |
| CN | 111038898 | A | 4/2020 |
| CN | 111115073 | A | 5/2020 |
| CN | 112298890 | A | 2/2021 |
| EP | 0253775 | A1 | 1/1988 |
| JP | S5592608 | U | 6/1980 |
| JP | S59138512 | A | 8/1984 |
| JP | S60103111 | U | 7/1985 |
| JP | 0288905 | U | 7/1990 |
| JP | 5213419 | A | 8/1993 |
| JP | 2000159099 | A | 6/2000 |
| JP | 2007314262 | A | 12/2007 |
| JP | 2012218927 | A | 11/2012 |
| JP | 2018039653 | A | 3/2018 |
| TW | M578694 | U | 6/2019 |

OTHER PUBLICATIONS

Chinese Office Action for Chinese Application No. 202011237192.X, dated Oct. 9, 2021, 9 pages.

* cited by examiner

SHUTTLE VEHICLE

CROSS-REFERENCE TO RELATED APPLICATIONS

This patent application is a national stage of International Application No. PCT/CN2021/125718, filed on Oct. 22, 2021, which claims the priority of the Chinese Patent Application filed on Nov. 9, 2020 with the application number 202011237192.X. The contents of each of the aforementioned applications are hereby incorporated by reference in their entireties.

TECHNICAL FIELD

Embodiments of the present disclosure relate to the field of intelligent warehousing, in particular to the field of warehousing machinery, and more particularly, to a shuttle vehicle.

BACKGROUND OF THE INVENTION

At present, due to increasing demands on warehouse storage capacity, as well as increasing demands on picking, conveying and frequency of entering and leaving warehouse, shelf shuttle vehicles are used more and more widely in the field of intelligent warehousing. A shuttle vehicle travels on a rail of a three-dimensional shelve, to transport a material box in a storage space of the shelf onto the shuttle vehicle, or transport the material box onto the storage space.

In the related art, a box conveying and pickup apparatus of the shuttle vehicle usually uses telescopic forks to move the material box.

SUMMARY OF THE INVENTION

Embodiments of the present disclosure propose a shuttle vehicle.

According to a first aspect of the present disclosure, a shuttle vehicle is provided, and the shuttle vehicle a vehicle body, a traveling apparatus and a box conveying and pickup apparatus, where, two horizontal support plates provided in parallel and spaced apart are fixed on the vehicle body, the two horizontal support plates are located on a same horizontal plane, a gap formed between the two horizontal support plates is perpendicular to a traveling direction of the vehicle body, and the two horizontal support plates are configured to carry a material box; the traveling apparatus is fixedly connected to the vehicle body and is used for driving the vehicle body to move along a rail; the box conveying and pickup apparatus includes a chain assembly and a fork, the chain assembly is provided below the horizontal support plates, and the chain assembly each include a chain, a sprocket group and a chain driving apparatus; the chain is wound around the sprocket group; the chain driving apparatus is connected to the sprocket group and is used for driving the chain to move in a vertical plane perpendicular to the traveling direction; a first end of the fork is fixedly connected to the chain, and a second end of the fork extends outwards in a normal direction of the chain; a bent portion bending upwards is formed at the second end, and the bent portion is used for contacting with an inner wall of a groove on a bottom surface of the material box, so as to push the material box to move along with the fork; when the shuttle vehicle moves to a preset position, the chain is configured to drive the fork to move, so that the bent portion gets into the groove on the bottom surface of the material box, and the chain is configured to drive the fork, in the gap, to push the material box along a direction parallel to the gap, so that the material box is moved from a shelf to the horizontal support plates or the material box is moved away from the horizontal support plates.

In some embodiments, the sprocket group includes a driving sprocket and a driven sprocket, the driving sprocket and the driven sprocket are rotatably provided below the horizontal support plates, a rotating shaft of the driving sprocket and a rotating shaft of the driven sprocket are parallel to the traveling direction, and a highest point of the driving sprocket in a vertical direction and a highest point of the driven sprocket in the vertical direction are located on a same horizontal plane, so that a part of the chain between the highest point of the driving sprocket and the highest point of the driven sprocket is a straight line parallel to the gap; when the fork is located in the straight-line part of the chain, the second end is located in the gap, and a tail end of the bent portion is higher than the horizontal support plates.

In some embodiments, the vehicle body further includes a chain support plate horizontally provided below the straight-line part of the chain, and a length direction of the chain support plate is parallel to the straight-line part of the chain.

In some embodiments, the box conveying and pickup apparatus includes two chain assemblies, the two chain assemblies are oppositely arranged on two sides of the gap, projections of the two chain assemblies on the horizontal plane are aligned, and the two chain assemblies are separated by a preset distance in the vertical direction, when the two chain assemblies move synchronously, the two chain assemblies remain relatively static; and the first end of the fork includes a vertical plate perpendicular to the gap, two side surfaces of the vertical plate facing to the two chain assemblies are respectively rotatably connected to side walls of the chains of the two chain assemblies, and connection positions of the vertical plate to the two chain assemblies are separated by the preset distance in the vertical direction, so that when the fork moves with the two chain assemblies, a pose of the fork remains unchanged.

In some embodiments, the box conveying and pickup apparatus further includes a synchronous shaft and two synchronous belt assemblies, a rotating shaft of the synchronous shaft is parallel to the rotating shaft of the driving sprocket, an end of the synchronous shaft is connected to the chain driving apparatus, and the synchronous shaft is simultaneously connected to the two chain assemblies through the two synchronous belt assemblies, so as to drive the chains of the two chain assemblies to rotate synchronously; each of the synchronous belt assemblies includes a driving pulley, a driven pulley and a synchronous belt, the driving pulley is fixedly connected to the synchronous shaft, and a rotating shaft of the driving pulley coincides with the rotating shaft of the synchronous shaft; the driven pulley is fixedly connected to a side surface of the driving sprocket, and a rotating shaft of the driven pulley coincides with the rotating shaft of the driving sprocket; and the synchronous belt is wound around the driving pulley and the driven pulley.

In some embodiments, the box conveying and pickup apparatus includes two forks arranged opposite to each other, and a chain length between the two forks is not less than a length of the material box.

In some embodiments, the vehicle body further includes a material box limiting plate, the material box limiting plate is fixedly arranged on a side of a horizontal support plate away from the gap, a length direction of the material box limiting plate is parallel to the gap, and an upper surface of the material box limiting plate is higher than an upper surface of the horizontal support plates.

In some embodiments, a limiting wheel group is fixedly arranged on a side surface of a bottom of the vehicle body, and rotating shafts of the limiting wheels are in the vertical direction; when the shuttle vehicle moves along the rail, the two limiting wheels are respectively situated on two sides of the inner wall of the rail, and outer peripheral surfaces of the two limiting wheels are in rolling contact with the inner wall of the rail.

In some embodiments, the chain is a double row chain.

In some embodiments, the vehicle body further includes an electric collector, and the electric collector is bonded to a collector wire of the rail.

According to a second aspect of the present disclosure, a warehousing system is provided, and the warehousing system includes: a rail, a material box, a shelf, and the above-mentioned shuttle vehicle, where the rail is arranged on a side of the shelf, and an extending direction of the rail is parallel to a horizontal arrangement direction of openings of the shelf; the material box is stored in the opening of the shelf, and the shuttle vehicle moves along the rail to put the material box into the opening or move the material box from the opening to the shuttle vehicle through the box conveying and pickup apparatus.

In some embodiments, two ends of a bottom surface of the material box are respectively depressed upwards to form grooves.

In some embodiments, the shelf includes a plurality of openings arranged in a straight line, an end of a bottom surface of each opening is provided with a notch, when the material box is placed in the opening, a projection of a groove of the bottom surface of the material box onto the bottom surface of the opening is located in the notch.

In the shuttle vehicle provided by embodiments of the present disclosure, the chain assembly drives the fork to push the material box to move, so as to realize box conveying or box picking up, which may simplify a structure of the shuttle vehicle and reduce a manufacturing cost of the shuttle vehicle.

BRIEF DESCRIPTION OF THE DRAWINGS

By reading detailed description of non-limiting embodiments with reference to the following accompanying drawings, other features, objectives and advantages of the present disclosure will become more apparent.

DESCRIPTION OF ACCOMPANYING DRAWINGS

- 10—rail; 20—shuttle vehicle; 30—material box; 31—groove; 40—shelf; 41—notch;
- 100—vehicle body; 200—traveling apparatus; 300—box conveying and pickup apparatus;
- 110—horizontal support plate; 120—material box limiting plate; 210—limiting wheel; 310—chain assembly; 320—fork; 330—synchronous shaft; 340—synchronous belt assembly; 350—chain driving apparatus;
- 311—chain; 312—sprocket group; 313—chain support plate; 321—first end; 322—bent portion; 341—driving pulley; 342—driven pulley; 343—synchronous belt;
- 3120—driving sprocket; 3121—driven sprocket.

DETAILED DESCRIPTION OF THE INVENTION

The present disclosure will be further described in detail below with reference to the accompanying drawings and embodiments. It may be understood that the specific embodiments described herein are only used to explain the related disclosure, but not to limit the disclosure. In addition, it should also be noted that, for ease of description, only parts related to the relevant disclosure are shown in the accompanying drawings.

It should be noted that the embodiments in the present disclosure and features in the embodiments may be combined with each other on a non-conflict basis. The present disclosure will be described below in detail with reference to the accompanying drawings and in combination with the embodiments.

Figure 1:
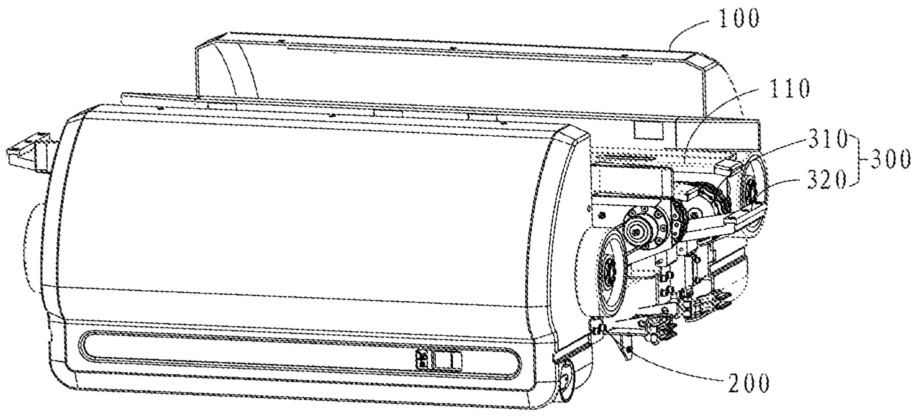
FIG. 1 is a schematic diagram of an overall structure of an embodiment of a shuttle vehicle according to the present disclosure.
Figure 2:
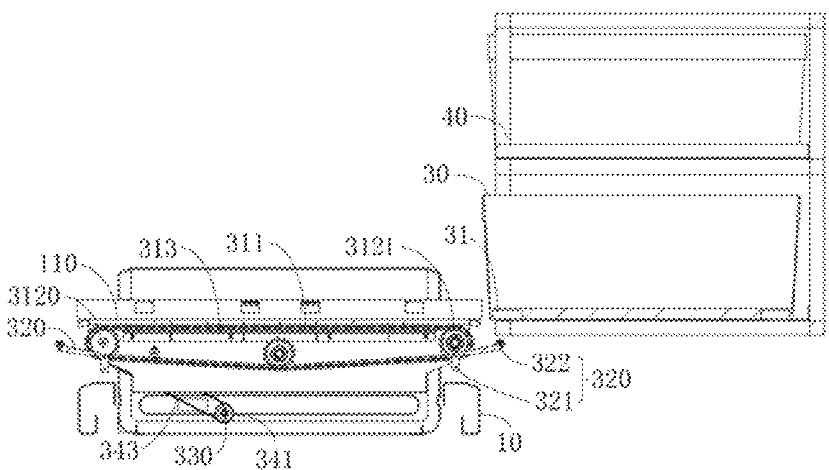
FIG. 2 is a schematic diagram of a scenario when the shuttle vehicle picks up a box according to the present disclosure.

FIG. 1 shows a schematic diagram of an overall structure of an embodiment of a shuttle vehicle according to the present disclosure. FIG. 2 shows a schematic diagram of a scenario of when the shuttle vehicle picks up a box according to the present disclosure. To illustrate with reference to FIG. 1 and FIG. 2, the shuttle vehicle of the present disclosure includes: a vehicle body 100, a traveling apparatus 200, and a box conveying and pickup apparatus 300, where two horizontal support plates 110 provided in parallel and spaced apart are fixed on the vehicle body 100, the two horizontal support plates 110 are located on a same horizontal plane, a gap formed between the two horizontal support plates 110 is perpendicular to a traveling direction of the vehicle body 100, and the horizontal support plates are configured to carry a material box 30; the traveling apparatus 200 is fixedly connected to the vehicle body 100 and is used for driving the vehicle body 100 to move along a rail 10; the box conveying and pickup apparatus 300 includes a chain assembly 310 and a fork 320, the chain assembly 310 is provided below the horizontal support plates 110, and the chain assembly 310 include a chain 311, a sprocket group 312 and a chain driving apparatus 350; the chain 311 is wound around the sprocket group 312, the chain driving apparatus 350 is connected to the sprocket group 312 and is used for driving the chain 311 to move in a vertical plane perpendicular to the traveling direction; a first end 321 of the fork 320 is fixedly connected to the chain 311, and a second end of the fork extends outwards in a normal direction of the chain 311; a bent portion 322 bending upwards is formed at the second end, and the bent portion 322 is used for contacting with an inner wall of a groove 31 on a bottom surface of the material box 30, so as to push the material box 30 to move along with the fork 320; when the shuttle vehicle moves to a side of the material box 30, the chain 311 drives the fork 320 to move, so that the bent portion 322 gets into the groove 31 on the bottom surface of the material box 30, and the chain 311 is configured to drive the fork 320, in the gap, to push the material box 30 along a direction parallel to the gap, so that the material box 30 is moved from the storage space of a shelf 40 to the horizontal support plates 110 or the material box 30 is moved away from the horizontal support plates 110.

In this embodiment, the chain 311 drives the fork 320 to make a circular movement around the sprocket group 312 in the vertical plane, and the fork 320 pushes the material box 30 to move, so as to realize box conveying and pickup actions of the shuttle vehicle.

As an example, the box conveying and pickup apparatus 300 may adopt one chain assembly 310, the chain 311 in the chain assembly 310 is arranged in the middle of the gap that is formed by the two horizontal support plates 110, and the first end 321 of the fork 320 may be fixedly connected to the chain 311 by a key, so that it may be ensured that the fork 320 moves in the gap with the chain 311 to push the material box 30 to move on the horizontal support plates 110. In this example, a part of the chain 311 close to the horizontal support plates 110 may be arranged obliquely relative to the horizontal support plates 110 (for example, two sprockets having different diameters may be used, or two sprockets having the same diameter may be arranged obliquely). In this way, as the fork 320 pushes the material box 30 to move in a horizontal direction, a distance between the fork 320 and the material box 30 in a vertical direction also changes accordingly. When the shuttle vehicle picks up the box, the chain 311 drives the fork 320 to move, to push the material box 30 to move from the shelf 40 which is located on one side of the shuttle vehicle to the horizontal support plates 110, until the material box 30 is completely moved to the horizontal support plates 110 and the bent portion 322 of the fork 320 is completely separated from the groove 31 on the bottom surface of the material box 30, so that the picking up of the box is realized. When the shuttle vehicle conveys the box, the chain 311 drives the fork 320 to move, to push the material box 30 to move away from the horizontal support plates 110 along the direction parallel to the gap, until the material box 30 is completely separated from the horizontal support plates 110 and the bent portion 322 of the fork 320 is completely separated from the groove 31 on the bottom surface of the material box 30, so that conveying of the box is realized.

As another example, in the scenario shown in FIG. 2, when the shuttle vehicle moves to a preset position (for example, the preset position may be a left side of the material box 30 to be transported) along the rail 10, a horizontal height of the two horizontal support plates 110 is equal to or slightly lower than a height of a bottom surface of the material box 30, and the gap formed by the two horizontal support plates 110 is aligned with the groove 31 on the bottom surface of the material box 30. Then, the chain driving apparatus 350 drives the chain 311 to rotate counter-clockwise in the vertical plane perpendicular to the traveling direction of the shuttle vehicle. When the fork 320 moves with the chain 311 to an end of the chain 311 close to the material box 30, the fork 320 moves from bottom to top along a curved path at the end of the chain 311, so that the bent portion 322 of the second end of the fork 320 gets into the groove 31 at the left end of the bottom surface of the material box 30. Then, the fork 320 moves with the chain 311 in a straight line along the direction parallel to the gap. The bent portion 322 of the fork 320 is closely attached to the inner wall of the groove 31, so as to push the material box 30 to move toward the horizontal support plates 110 along the direction parallel to the gap. As the fork 320 moves in the gap, the material box 30 gradually moves from the shelf 40 to the horizontal support plates 110 of the shuttle vehicle. When the material box 30 is completely moved onto the horizontal support plates 110, the fork 320 moves from top to bottom along a curved path at the other end of the chain 311, so that the bent portion 322 of the fork 320 is gradually separated from the groove 31, thereby the picking up of the box is realized. When the shuttle vehicle transports the material box 30 to a target position (for example, the target position may be a sorting station located on the left side of the shuttle vehicle in FIG. 2), the chain driving apparatus 350 drives the chain 311 to rotate counter-clockwise until the bent portion 322 of the fork 320 gets into the groove 31 at the right end of the bottom surface of the material box 30, then the fork 320 pushes the material box 30 to move to the sorting station in the direction parallel to the gap. Until the material box 30 is completely moved to the sorting station and the bent portion 322 of the fork 320 is separated from the groove 31, the conveying of the box is realized.

Preferably, two ends of the horizontal support plates 110 may be provided with a downwardly inclined slope or a downwardly curved surface, so that the material box 30 may pass through a transition section between the shelf 40 and the horizontal support plates 110 more smoothly.

Preferably, a tail end of the bent portion 322 of the fork 320 may be provided with a stopper. For example, the stopper may be made of nylon material, to improve friction between the bent portion 322 and the inner wall of the groove 31, so as to prevent the fork 320 from falling off from the groove 31 when the fork 320 pushes the material box 30 to move.

Compared with a fork 320 using a telescopic structure in related technologies, the shuttle vehicle provided in the embodiments of the present disclosure drives, through the chain assembly 310, the fork 320 to push the material box 30 to move, so as to realize box conveying or box pickup, which may simplify the structure of the shuttle vehicle and reduce the manufacturing cost of the shuttle vehicle.

In some alternative implementations of this embodiment, the chain 311 is a double row chain, which may improve the strength of the chain.

In some alternative implementations of this embodiment, the vehicle body 100 further includes an electric collector (not shown in the figure), and the electric collector is bonded to a collector wire of the rail 10, so that the electric collector may be continuously energized during the travel of the shuttle vehicle.

In some alternative implementations of this embodiment, the vehicle body 100 further includes material box limiting plate(s) 120, the material box limiting plate(s) 120 is/are fixedly arranged on a side of the horizontal support plate(s) 110 away from the gap, a length direction of the material box limiting plate(s) 120 is parallel to the gap, and an upper surface of the material box limiting plate(s) 120 is higher than an upper surface of the horizontal support plate(s). By providing the material box limiting plate(s) 120, lateral displacement of the material box 30 on the horizontal support plate(s) 110 may be limited to prevent the material box 30 from falling off from the shuttle vehicle.

With further reference to FIG. 2, in some alternative implementations of this embodiment, the box conveying and pickup apparatus 300 includes two forks 320 arranged opposite to each other, and a chain length between the two forks 320 is not less than a length of the material box 30. As an example, the two forks 320 may be oppositely arranged at the left curved part and right curved part of the chain 311, so that a distance between the fork 320 and the groove 31 on the bottom surface of the material box 30 may be shortened, thereby shortening time-consuming for picking up or conveying the material box.

With further reference to FIG. 2, in some alternative implementations of this embodiment, the sprocket group 312 includes a driving sprocket 3120 and a driven sprocket 3121, the driving sprocket 3120 and the driven sprocket 3121 are rotatably provided below the horizontal support plates 110, a rotating shaft of the driving sprocket 3120 and a rotating shaft of the driven sprocket 3121 are parallel to the traveling direction, and a highest point of the driving sprocket 3120 in a vertical direction and a highest point of the driven sprocket 3121 in the vertical direction are located on the same horizontal plane, so that a part of the chain 311 between the highest point of the driving sprocket 3120 and the highest point of the driven sprocket 3121 is a straight line parallel to the gap; when the fork 320 is located in the straight-line part of the chain 311, the second end is located in the gap, and a tail end of the bent portion 322 is higher than the horizontal support plates 110.

As an example, the driving sprocket 3120 and the driven sprocket 3121 having the same diameter may be used, and center heights of the driving sprocket 3120 and the driven sprocket 3121 are the same, so as to ensure that the part of the chain 311 between the highest point of the driving sprocket 3120 and the highest point of the driven sprocket 3121 is the straight line parallel to the gap. The driving sprocket 3120 and the driven sprocket 3121 having different diameters may also be used, then a difference between the center height of the driving sprocket 3120 and the center height of the driven sprocket 3121 is equal to a difference between the radius of the driving sprocket 3120 and the radius of the driven sprocket 3121, and similarly it may be ensured that the part of the chain 311 between the highest point of the driving sprocket 3120 and the highest point of the driven sprocket 3121 is the straight line parallel to the gap.

Thus, the fork 320 moving along the curved path at two ends of the chain 311 may realize contact or separation between the bent portion 322 and the grooves 31, then, by controlling a direction of rotation of the chain 311, box conveying or box picking-up in two directions may be realized.

In an example, when the material box 30 is located on the shelf 40 on the left side of the shuttle vehicle, the chain 311 rotates counter-clockwise to drive the fork 320 to move from bottom to top along a curved path at the right end of the chain 311, so that the bent portion 322 of the fork 320 gets into the groove 31 at the left end of the bottom surface of the material box 30. Then, the chain 311 continues to drive the fork 320 to move in the gap, so as to push the material box 30 to move from the shelf 40 onto the horizontal support plates 110. When the material box 30 is completely moved onto the horizontal support plates 110, the chain 311 drives the fork 320 to move from top to bottom along a curved path at the left end of the chain 311, so that the bent portion 322 of the fork 320 is separated from the groove 31 at the left end of the bottom surface of the material box 30, thereby picking up the box is realized. It may be understood that if the material box 30 is located on the shelf 40 on the right side of the shuttle vehicle, by changing the direction of rotation of the chain 311 into clockwise, the box picking up may be realized.

With further reference to this example, box conveying of the shuffle vehicle is described. When a target storage space for storing the material box 30 is located on the left side of the shuttle vehicle, the chain 311 rotates clockwise to drive the fork 320 to move from bottom to top along a curved path at the left end of the chain 311, so that the bent portion 322 of the fork 320 gets into the groove 31 at the left end of the bottom surface of the material box 30. Then, the material box 30 is pushed to move to the right on the horizontal support plates 110 until the material box 30 is completely moved onto the shelf 40. In this regard, the chain 311 drives the fork 320 to move from top to bottom along a curved path at the right end of the chain 311, so that the bent portion 322 of the fork 320 is separated from the groove 31, thereby box conveying is realized. It may be understood that when the material box 30 is located on the left side of the shuttle vehicle, by driving the chain 311 to rotate counter-clockwise, so that the box conveying may be realized.

Further, the sprocket group 312 in this implementation may further include a tensioning wheel, which is connected to the part of the chain 311 away from the horizontal support plates 110 to ensure that the chain 311 is in a tensioned state.

Figure 4:
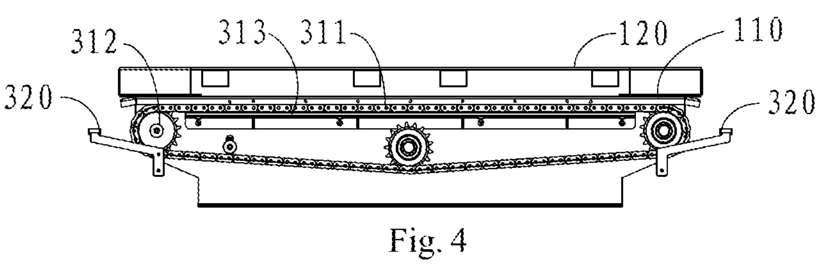
FIG. 4 is a cross-sectional view of an embodiment of the shuttle vehicle according to the present disclosure.

With further reference to FIG. 4, FIG. 4 show a cross-sectional view of an embodiment of the shuttle vehicle according to the present disclosure. As shown in FIG. 4, the vehicle body 100 in this embodiment further includes a chain support plate 313 horizontally provided below the straight-line part of the chain 311, and a length direction of the chain support plate 313 is parallel to the straight-line part of the chain 311. When the chain 311 is slack, it may be ensured that the chain 311 within a range of a length of the chain support plate maintains a straight line state or an approximately straight line state.

Figure 3:
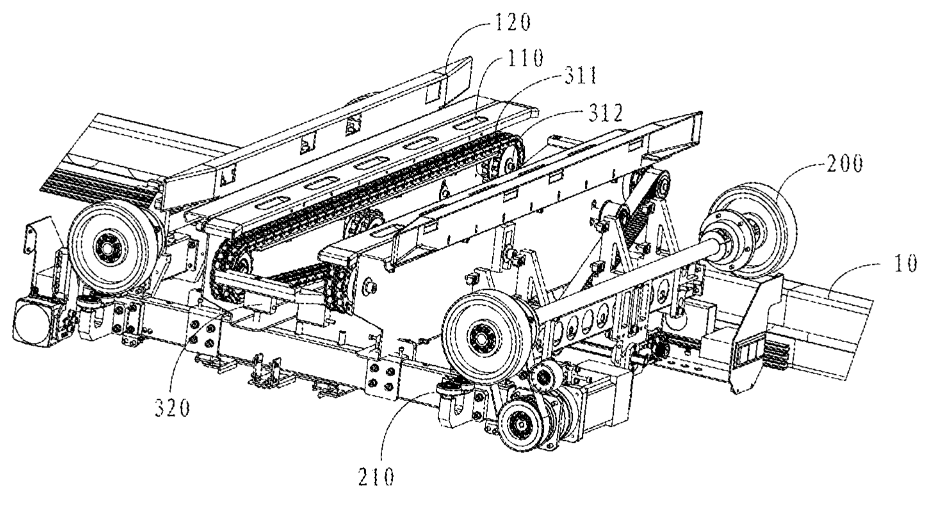
FIG. 3 is a schematic diagram of an overall structure of another embodiment of the shuttle vehicle according to the present disclosure.

With further reference to FIG. 3, FIG. 3 shows a schematic diagram of an overall structure of another embodiment of the shuttle vehicle according to the present disclosure. As shown in FIG. 3, in this embodiment, limiting wheel group(s) are fixedly arranged on side surface(s) of a bottom of the vehicle body 100. The limiting wheel group includes at least two limiting wheels 210, and rotating shafts of the limiting wheels 210 are in the vertical direction; when the shuttle vehicle moves along the rail 10, the two limiting wheels 210 are respectively located on two sides of the inner wall of the rail 10, and outer peripheral surfaces of the two limiting wheels 210 are in rolling contact with the inner wall of the rail 10. As an example, four groups of limiting wheels 210 may be provided at the bottom of the vehicle body 100 of the shuttle vehicle to improve reliability of the shuttle vehicle as it travels along the rail 10.

With further reference to FIG. 3, as shown in FIG. 3, in this embodiment, the box conveying and pickup apparatus 300 includes two chain assemblies 210, the two chain assemblies 310 are oppositely arranged on two sides of the gap, projections of the two chain assemblies 310 on the horizontal plane are aligned, and the two chain assemblies 310 are separated by a preset distance in the vertical direction, when the two chain assemblies 310 move synchronously, the two chain assemblies remain relatively static; and the first end 321 of the fork 320 includes a vertical plate perpendicular to the gap, two side surfaces of the vertical plate facing to the two chain assemblies 310 are respectively rotatably connected to side walls of the chains of the two chain assemblies 310, and connection positions of the vertical plate to the two chain assemblies 310 are separated by the preset distance in the vertical direction, so that when the fork 320 moves with the two chain assemblies 310, the pose of the fork 320 remains unchanged.

In this embodiment, each chain assembly 310 may be connected with a chain driving apparatus 350, and both of the chain driving apparatuses 350 use the same operating parameters to drive two chains 311 in synchronous rotation. By limiting a position of connection between the fork 320 and the two chains 311, it may be ensured that the pose of the fork 320 remain unchanged when the chains 311 drives the fork 320 to move. On the one hand, a fitting degree between the bent portion 322 of the fork 320 and the groove 31 of the material box 30 may be improved, and on the other hand, the fork 320 may be prevent from coming out of the groove 31 during conveying or picking up the material box.

Figure 5:
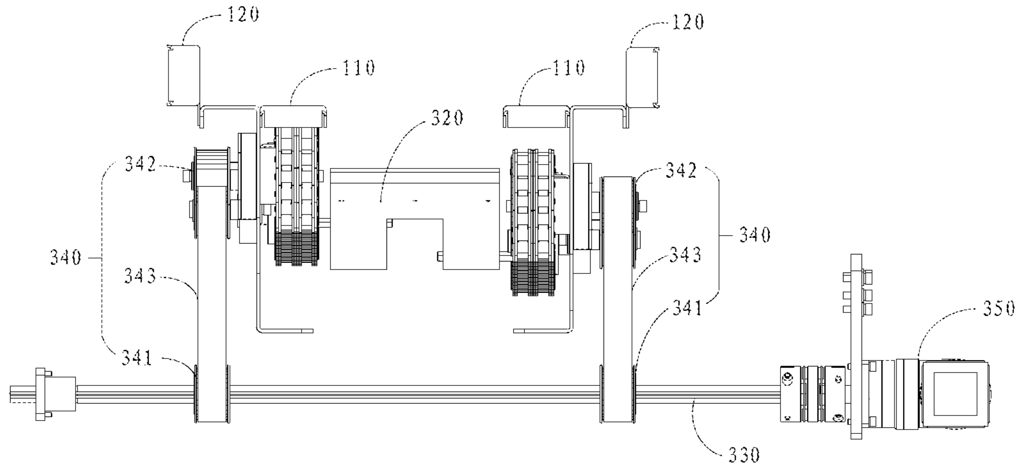
FIG. 5 is a cross-sectional view from another viewing angle of an embodiment of the shuttle vehicle according to the present disclosure.

As a further example in connection with FIG. 5, FIG. 5 shows a cross-sectional view from another viewing angle of an embodiment of the shuttle vehicle according to the present disclosure. The two side surfaces of the first end 321 of the fork 320 in this implementation may be rotatably connected to the chains 311 on two sides of the gap through pin shafts, respectively. In addition, the two pin shafts are separated by the preset distance in vertical height, so that it may be ensured that the pose of the fork 320 remains unchanged as it rotates with the two chains 311.

Figure 6:
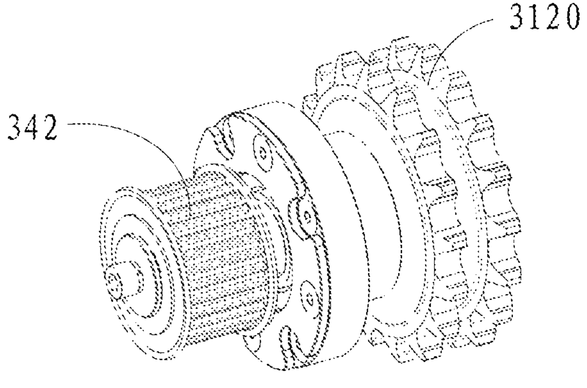
FIG. 6 is a schematic structural diagram of a driving sprocket in an embodiment of the shuttle vehicle according to the present disclosure.

With further reference to FIG. 5 and FIG. 6, FIG. 6 shows a schematic structural view of the driving sprocket 3120 in an embodiment of the shuttle vehicle according to the present disclosure. In some alternative implementations of this embodiment, the box conveying and pickup apparatus 300 further includes a synchronous shaft 330 and two synchronous belt assemblies 340, a rotating shaft of the synchronous shaft 330 is parallel to the rotating shaft of the driving sprocket 3120, an end of the synchronous shaft 330 is connected to the chain driving apparatus 350, and the synchronous shaft 330 is simultaneously connected to the two chain assemblies 310 through the two synchronous belt assemblies 340, so as to drive the chains of the two chain assemblies 310 to rotate synchronously; each of the synchronous belt assemblies 340 includes a driving pulley 341, a driven pulley 342 and a synchronous belt 343, the driving pulley 341 is fixedly connected to the synchronous shaft 330, and a rotating shaft of the driving pulley 341 coincides with the rotating shaft of the synchronous shaft 330; as shown in FIG. 6, the driven pulley 342 is fixedly connected to a side surface of the driving sprocket 3120, and a rotating shaft of the driven pulley 342 coincides with the rotating shaft of the driving sprocket 3120; and the synchronous belt 343 is wound around the driving pulley 341 and the driven pulley 342.

In this implementation, the chain driving apparatus 350, through the synchronous shaft 330 and the synchronous belt assemblies 340, may drive the chains 311 in the two chain assemblies 310 to rotate simultaneously, ensuring that the two chains 311 remain relatively static, which helps reduce a weight and the manufacturing cost of the shuttle vehicle, and also avoids unstable pose of the fork 320 when the chains 311 being out of synchronization.

Figure 7:
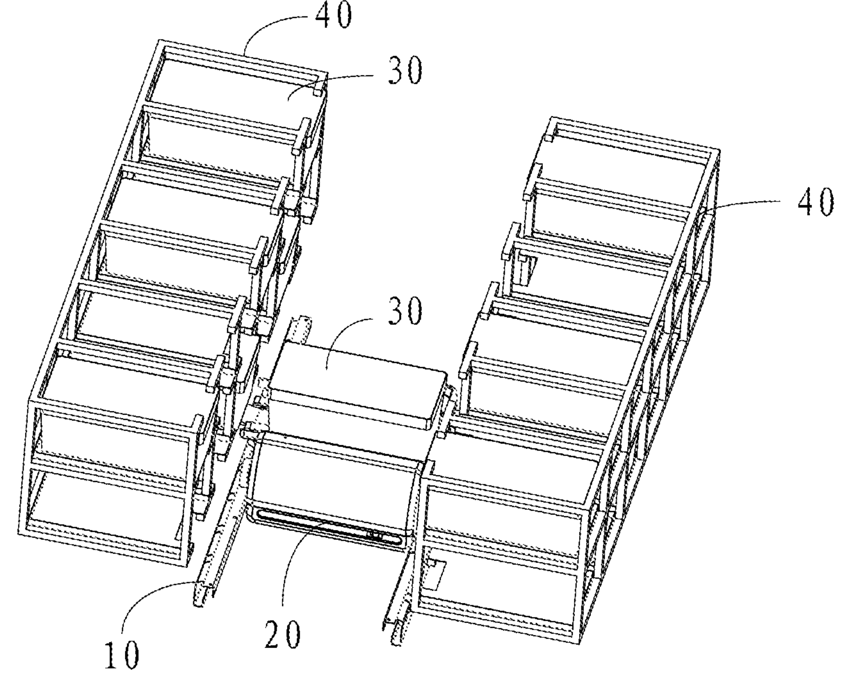
FIG. 7 is a schematic structural diagram of an embodiment of a warehousing system according to the present disclosure.

With further reference to FIG. 7, FIG. 7 shows a schematic structural diagram of an embodiment of a warehousing system according to the present disclosure, including a rail 10, a material box 30, a shelf 40, and the above shuttle vehicle 20, where the rail 10 is arranged on a side of the shelf 40, and an extending direction of the rail 10 is parallel to a horizontal arrangement direction of openings of the shelf 40; the material box 30 is stored in the opening of the shelf 40, and the shuttle vehicle 20 moves along the rail 10 to put the material box 30 into the opening or move the material box 30 from the opening to the shuttle vehicle through the box conveying and pickup apparatus 300.

In this embodiment, the shuttle vehicle 20 travels along the rail 10, the box conveying and pickup apparatus 300 may transport the material box 30 from the shelf 40 on one side of the shuttle vehicle to the shuttle vehicle 20 or move the material box 30 carried on the shuttle vehicle 20 to the shelf 40, thus realizing automated transport of the material box 30. Moreover, since the shuttle vehicle 20 uses the chain assemblies 310 to drive the fork(s) 320 to move, a manufacturing cost of warehousing equipment may be reduced.

Figure 8:
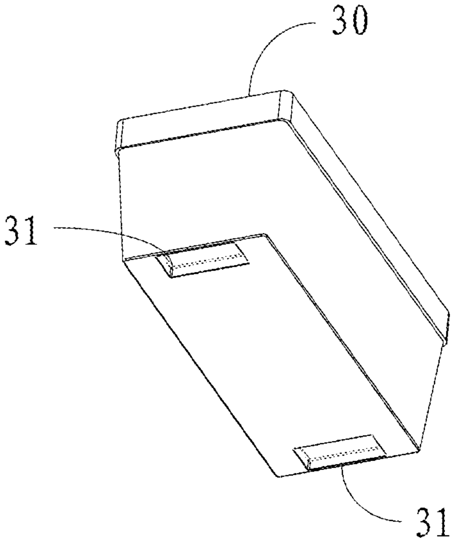
FIG. 8 is a schematic structural diagram of a material box in an embodiment of the warehousing system according to the present disclosure.

With further reference to FIG. 8, FIG. 8 shows a schematic structural view of the material box 30 in an embodiment of the warehousing system according to the present disclosure. As shown in FIG. 8, two ends of a bottom surface of the material box 30 are respectively depressed upwards to form grooves 31. In this embodiment, the material box 30 is used to accommodate items, and the groove(s) 31 on the bottom surface is used to fit with the fork(s) 320 of the shuttle vehicle in the previous embodiment to allow the shuttle vehicle to transport the material box 30.

Figure 9:
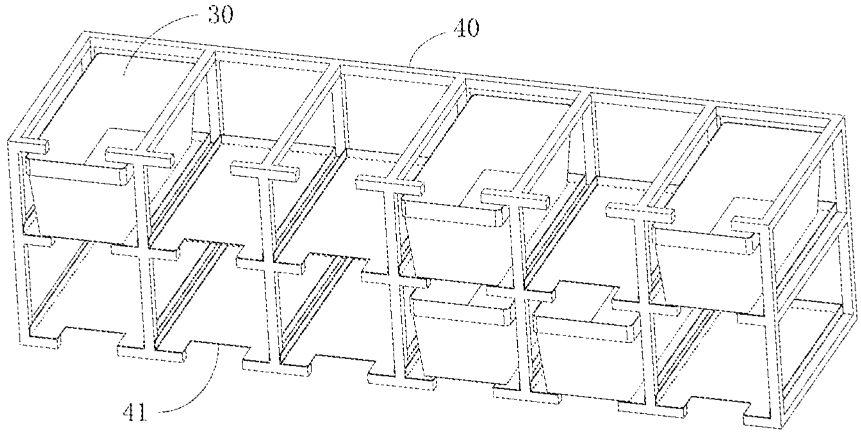
FIG. 9 is a schematic structural diagram of a shelf in an embodiment of the warehousing system according to the present disclosure.

Finally, referring to FIG. 9, FIG. 9 shows a schematic structural view of a shelf 40 in an embodiment of the warehousing system according to the present disclosure. As shown in FIG. 9, the shelf 40 includes a plurality of openings arranged in a straight line, an end of a bottom surface of each opening is provided with a notch 41, and when the material box 30 is placed in the opening, a projection of a groove 31 of the bottom surface of the material box 30 onto the bottom surface of the opening is located in the notch 41. The shelf 40 in this embodiment, by providing the notch 41 structure, allows the fork(s) 320 of the shuttle vehicle in the previous embodiment to move from the bottom surface of the material box 30 into the groove 31 on the bottom surface of the material box 30 that is arranged on the shelf 40.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A shuttle vehicle, comprising: a vehicle body, a traveling apparatus and a box conveying and pickup apparatus, wherein, two horizontal support plates provided in parallel and spaced apart are fixed on the vehicle body, the two horizontal support plates are located on a same horizontal plane, a gap formed between the two horizontal support plates is perpendicular to a traveling direction of the vehicle body, and the two horizontal support plates are configured to carry a material box;

the traveling apparatus is fixedly connected to the vehicle body and is used for driving the vehicle body to move along a rail;

the box conveying and pickup apparatus comprises a chain assembly and a fork, the chain assembly is provided below the horizontal support plates, and the chain assembly comprises a chain, a sprocket group, and a chain driving apparatus; the chain is wound around the sprocket group; the chain driving apparatus is connected to the sprocket group and is used for driving the chain to move in a vertical plane perpendicular to the traveling direction of the vehicle body; a first end of the fork is fixedly connected to the chain, and a second end of the fork extends outwards in a normal direction of the chain; a bent portion bending upwards is formed at the second end, and the bent portion is used for contacting with an inner wall of a groove at a bottom of the material box, so as to push the material box to move along with the fork;

when the shuttle vehicle moves to a preset position, the chain is configured to drive the fork to move, so that the bent portion gets into the groove at the bottom of the material box, and the chain is configured to drive the fork in the gap to push the material box along a direction parallel to the gap, so that the material box is moved from a shelf to the horizontal support plates or the material box is moved away from the horizontal support plates, wherein the sprocket group comprises a driving sprocket and a driven sprocket, the driving sprocket and the driven sprocket are rotatably provided below the horizontal support plates, a rotating shaft of the driving sprocket and a rotating shaft of the driven sprocket are parallel to the traveling direction of the vehicle body, and a highest point of the driving sprocket in a vertical direction and a highest point of the driven sprocket in the vertical direction are located on a same horizontal plane, so that a part of the chain between the highest point of the driving sprocket and the highest point of the driven sprocket is a straight line parallel to the gap.

2. The shuttle vehicle according to claim 1, wherein when the fork is located in the straight-line part of the chain, the second end is located in the gap, and a tail end of the bent portion is higher than the horizontal support plates.

3. The shuttle vehicle according to claim 1, wherein the vehicle body further comprises a chain support plate horizontally provided below the straight-line part of the chain, and a length direction of the chain support plate is parallel to the straight-line part of the chain.

4. The shuttle vehicle according to claim 2, wherein the box conveying and pickup apparatus comprises two chain assemblies, the two chain assemblies are oppositely arranged on two sides of the gap, projections of the two chain assemblies on the horizontal plane are aligned, and the two chain assemblies are separated by a preset distance in the vertical direction, when the two chain assemblies move synchronously, the two chain assemblies remain relatively static; and the first end of the fork comprises a vertical plate perpendicular to the gap, two side surfaces of the vertical plate facing the two chain assemblies are respectively rotatably connected to side walls of the chains of the two chain assemblies, and connection positions of the vertical plate to the two chain assemblies are separated by the preset distance in the vertical direction, so that when the fork moves with the two chain assemblies, a pose of the fork remains unchanged.

5. The shuttle vehicle according to claim 4, wherein the box conveying and pickup apparatus further comprises a synchronous shaft and two synchronous belt assemblies, a rotating shaft of the synchronous shaft is parallel to the rotating shaft of the driving sprocket, an end of the synchronous shaft is connected to the chain driving apparatus, and the synchronous shaft is simultaneously connected to the two chain assemblies through the two synchronous belt assemblies, so as to drive the chains of the two chain assemblies to rotate synchronously;

each of the synchronous belt assemblies comprises a driving pulley, a driven pulley and a synchronous belt, the driving pulley is fixedly connected to the synchronous shaft, and a rotating shaft of the driving pulley coincides with the rotating shaft of the synchronous shaft; the driven pulley is fixedly connected to a side surface of the driving sprocket, and a rotating shaft of the driven pulley coincides with the rotating shaft of the driving sprocket; and the synchronous belt is wound around the driving pulley and the driven pulley.

6. The shuttle vehicle according to claim 1, wherein the box conveying and pickup apparatus comprises two forks arranged opposite to each other, and a chain length between the two forks is not less than a length of the material box.

7. The shuttle vehicle according to claim 1, wherein the vehicle body further comprises a material box limiting plate, the material box limiting plate is fixedly arranged on a side of a horizontal support plate away from the gap, a length direction of the material box limiting plate is parallel to the gap, and an upper surface of the material box limiting plate is higher than an upper surface of the horizontal support plate.

8. The shuttle vehicle according to claim 1, wherein a limiting wheel group is fixedly arranged on a side surface of a bottom of the vehicle body, the limiting wheel group comprises at least two limiting wheels, and rotating shafts of the limiting wheels are in the vertical direction; when the shuttle vehicle moves along the rail, the two limiting wheels are respectively situated on two sides of an inner wall of the rail, and outer peripheral surfaces of the two limiting wheels are in rolling contact with the inner wall of the rail.

9. The shuttle vehicle according to claim 1, wherein the chain is a double row chain.

10. The shuttle vehicle according to claim 1, wherein two ends of the horizontal support plates are each provided with a downwardly curved surface.

11. The shuttle vehicle according to claim 1, wherein the driving sprocket and the driven sprocket have different diameters, and a difference between a height of a center of the driving sprocket and a height of a center of the driven sprocket is equal to a difference between a radius of the driving sprocket and a radius of the driven sprocket.

12. A warehousing system comprising the shuttle vehicle according to claim 1, the warehousing system further comprising a rail, a material box, and a shelf, wherein the rail is arranged on a side of the shelf, and an extending direction of the rail is parallel to a horizontal arrangement direction of openings of the shelf; the material box is stored in the opening of the shelf, and the shuttle vehicle moves along the rail to put the material box into the opening or move the material box from the opening to the shuttle vehicle through the box conveying and pickup apparatus.

13. The warehousing system according to claim 12, wherein two ends of a bottom surface of the material box are respectively depressed upwards to form grooves.

14. The warehousing system according to claim 12, wherein the shelf comprises a plurality of openings arranged in a straight line, an end of a bottom surface of each opening is provided with a notch, when the material box is placed in the opening, a projection of a groove of the bottom surface of the material box onto the bottom surface of the opening is located in the notch.

* * * * *